July 22, 1958 O. F. BEIJER ET AL 2,844,041
ROTARY VIBRATOR
Filed March 16, 1955 3 Sheets-Sheet 1
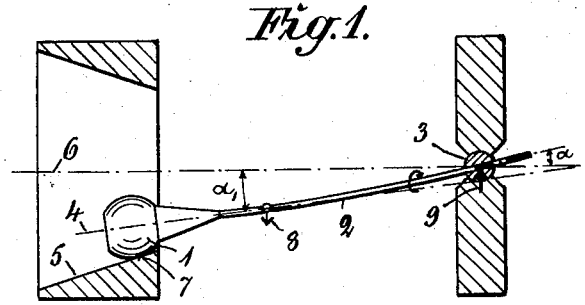
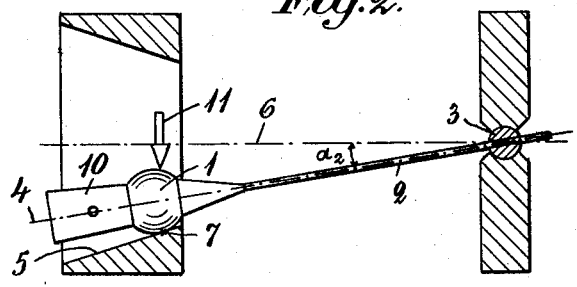
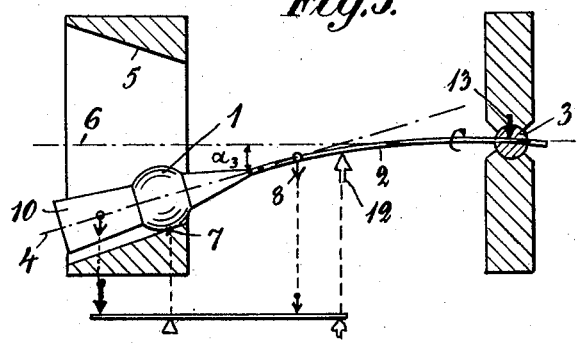

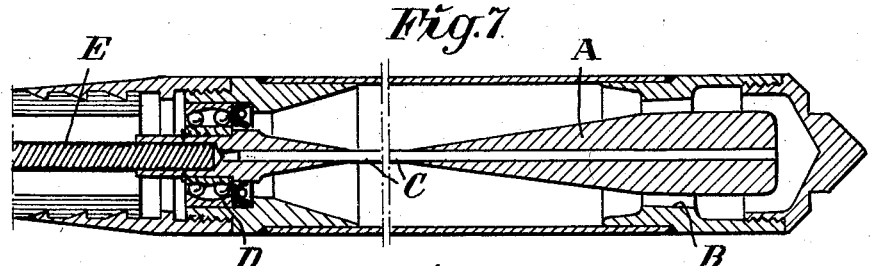
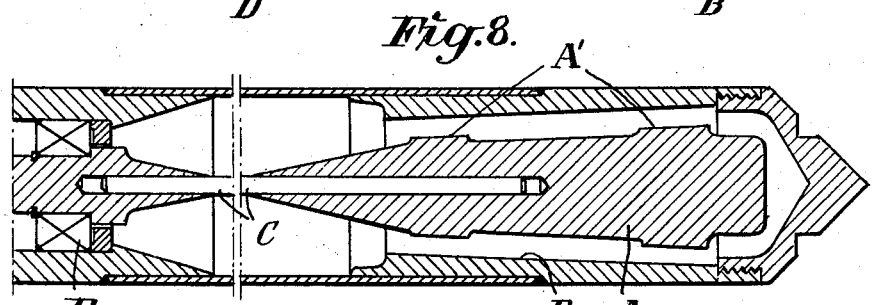
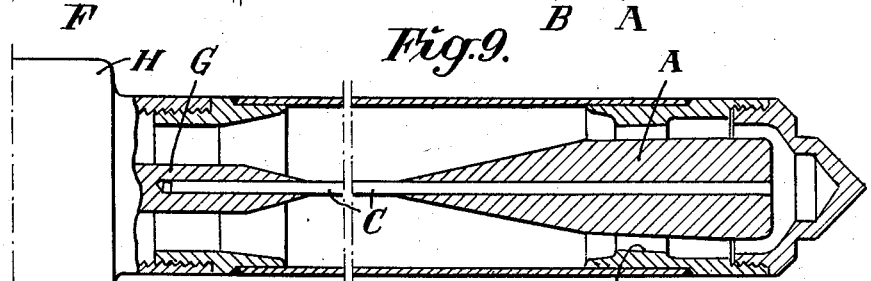
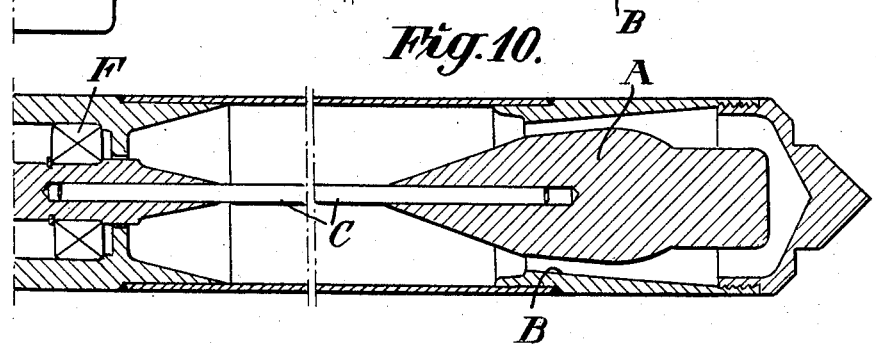

United States Patent Office 2,844,041
Patented July 22, 1958

2,844,041
ROTARY VIBRATOR

Oscar Fredrik Beijer, Lidingo, and Sven-Åke Nordegren, Stockholm, Sweden, assignors to Vibro-Plus Corp., Woodside, N. Y., a corporation of Delaware Application March 16, 1955, Serial No. 494,698

4 Claims. (Cl. 74—87)

This invention relates to a rotary vibrator of the type operating in principle as a conical pendulum and comprising a roller track and a roller body adapted to cooperate with said track for executing, when rotating around its own axis, a vibration generating planetary movement. More particularly the invention relates to a rotary vibrator of the type defined, wherein the roller body is rigidly attached to one end of a resilient shaft supported at some distance from the roller track in a bearing, the race of which is substantially coaxial with the roller track, wherein the active part of the roller track has a diameter decreasing in the direction towards the said bearing.

The main object of the invention is to reduce the tendency of the resilient shaft in such vibrators to form an angle with the central axis of the roller track in the bearing as a result of the centrifugal forces set up in the vibrator during operative conditions. This tendency of the resilient shaft, which is present independently of whether the shaft is mounted in a bearing allowing angular deviation or in a rigid bearing, represents a considerable drawback the elimination of which enables those skilled in the art to utilize the advantages of the said vibrator design to a greater extent provided that such elimination can take place without making the vibrator structure more complicated or appreciably more expensive. The present invention discloses that this is possible.

Figure 4:
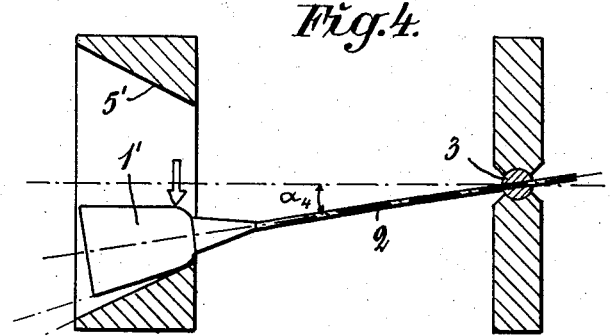
Figure 5:
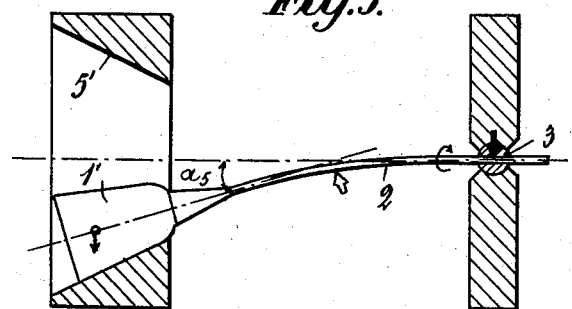
Figure 6:
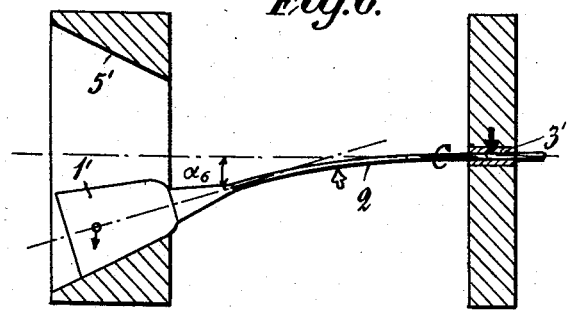

To facilitate understanding of the invention it will hereinafter be more particularly described with reference to the accompanying drawings, wherein;

Fig. 1 shows a vibrator of the type to which the invention relates but in which the inventive principle is not applied, Fig. 2 shows a vibrator of the same type as in Fig. 1 but in which the inventive principle is applied, the vibrator being at rest, Fig. 3 shows the vibrator of Fig. 2 under operative conditions, Fig. 4 shows a modified form of the vibrator according to the invention at rest, Fig. 5 shows the vibrator of Fig. 4 in operation, Fig. 6 shows a vibrator substantially similar to that shown in Figs. 4 and 5, but having a bearing for the flexible shaft which does not allow angular deviation, Figs. 1-6 inclusive are all mainly diagrammatic longitudinal sections intended to demonstrate the inventive principle.

Figs. 7, 8, 9 and 10, respectively, show less diagrammatic longitudinal sections of four different vibrators embodying the invention.

In Fig. 1, which shows a vibrator to which the inventive principle is not applied, 1 is a roller body which is attached to one end of a resilient or flexible shaft 2 mounted in a self-aligning or spherical ball bearing 3. During operation the roller body 1 has imparted to it a rotary movement through the shaft 2 so that it will rotate about its own geometrical axis 4 and thereby execute a planetary rolling movement along an annular roller track 5, the diameter of which increases in the direction towards the bearing 3. The bearing 3 is coaxially located with respect to the central axis 6 of the roller track 5. Owing to the centrifugal force set up by the planetary movement of the roller body 1 around the central axis 6 of the roller track 5, the shaft 2 will obviously be deflected between the roller body 1, which is supported against the roller track at the point 7, and the bearing 3, this being indicated by the arrow 8. In this way the angle $\alpha_1$, between the geometrical axis 4 of the roller body 1 and the central axis 6 of the roller track 5 will become appreciably smaller when the vibrator is in operation than when it is at rest while at the same time the angle $\alpha$ between the part of the flexible shaft 2 nearest to the bearing 3 and the central axis 6 of the roller track 5 will be increased. A supporting force represented by the arrow 9 then acts on the shaft in the bearing and this force is directed radially inwards from the point at which the centre of gravity of the rolling body 1 is momentarily located. It is obvious that the conditions will be similar in principle if the flexible shaft 2 is mounted in a bearing that does not allow angular deviation, though in that case the angle $\alpha$ will always be 0 notwithstanding the endeavour of the shaft 2 to produce angular deviation, this, of course, giving rise to a substantial increase in the bearing stresses.

If the vibrator illustrated in Fig. 1 is now supplemented by the arrangement according to the invention the vibrator structure will in principle be the one shown in Figs. 2 and 3. In the latter figures the parts that fully correspond to those in Fig. 1 are denoted by the same numerals, and it will be seen from this that a form of extension 10 is provided on the roller body 1, the said extension being situated outside the radial plane in which the point of contact 7 between the roller body 1 and the roller track 5 is located. In order to achieve the intended effect, the generatrix of the extension 10 must be radially separated from the generatrix of the roller track 5, when the roller body 1 as in Fig. 2 is at rest and is pressed against the roller track 5 by a force represented by the arrow 11 and acting substantially in the aforesaid radial plane. If the bearing 3 which allows angular deviation is replaced by a bearing which does not allow such deviation, the said requirement must still be fulfilled if the advantages of the invention shall be gained. With both forms of bearings the geometrical axis 4 of the roller body 1 will form an angle with the central axis 6 of the roller track 5 which is here denoted by $\alpha_2$ and which may be regarded as a static angle.

The extension 10 has such a large mass and a centre of gravity so located that, when the vibrator is working as shown in Fig. 3, owing to the centrifugal force it will generate a moment around the point of contact 7 which will exceed by a given amount the moment generated around the same point by the force 8 causing the deflection of the shaft 2. In this way a surplus moment, represented in Fig. 3 by the arrow 12, is set up and tends to increase the angle between the geometrical axis 4 of the roller body 1 and the central axis 6 of the roller track 5. The angle $\alpha_3$ in Fig. 3, which is to be regarded as a dynamic angle, is therefore greater than the static angle $\alpha_2$ in Fig. 2, notwithstanding the fact that in both cases the roller body 1 is in contact with the roller track 5. The bearing 3 endeavours to counteract this angular increase by a force 13 which replaces the force 9 of Fig. 1 in the bearing and which always acts in the opposite direction to the last-mentioned force, that is to say, radially inwards and towards the point at which the centre of gravity of the roller body 1 is momentarily located. In this way the resilient shaft 2 will be caused to bend inwards instead of outwards when the vibrator is working, and this in turn means that the angle between the central axis 6 of the roller track 5 and the part of the shaft 2 nearest to the bearing 3 will approach zero. By over-dimensioning the extension 10 it is, of course, also possible to obtain a negative angular value which may be desirable in exceptional cases. Under all conditions the stresses in the bearing 3 will be reduced in relation to the case according to Fig. 1. At the same time the resilient shaft 2 will be subjected to lower stresses. The result will, of course, be the same even when the shaft 2 is mounted in a bearing which does not allow angular deviation.

In Figs. 4 and 5, which correspond in principle to Figs. 2 and 3, it is shown how overdimensioning of the roller body can be avoided and at the same time a larger contact surface obtained between the roller body and the roller track by forming the roller body 1' in such a way that the generatrix of its extension will coincide during the normal operation of the vibrator with the generatrix of the roller track 5'. This limits the maximum value for the dynamic angle $\alpha_5$ (Fig. 5) which, of course, will still be greater than the static angle $\alpha_4$ in Fig. 4. If, as in Fig. 6, the resilient shaft 2 is mounted in a bearing 3' which does not allow angular deviation it is obvious that the conditions will be substantially the same when the vibrator is working as in the case according to Fig. 5, so that the stresses in the bearing will be appreciably less than if the extension of the roller body did not exist.

It should be noted that it is an essential part of the invention that the shaft 2 should be resiliently flexible. If this is not the case nothing particular can be gained by causing the supporting force in the bearing to change its direction. Moreover, the angular deviation of the bearing during operation cannot be influenced in the most favourable manner if the shaft is rigid. It has been found advantageous, however, to partially stiffen the flexible shaft, and stiffening of the shaft, particularly in the vicinity of the roller body, has been found to be of advantage since the resilient shaft will then bend during operation in a manner which nearly coincides with the bending of a shaft rigidly fixed at one end, which is subjected to a radial load at its free end. In place of a bearing which directly supports the resilient shaft an elastic coupling may be employed between the end of the flexible shaft and the adjacent end of a rigid driving shaft mounted in a supporting bearing.

In Figs. 7-10, which are examples of the practical application of the inventive principle, the roller body is indicated at A, the roller track at B and the resilient shaft at C. In Fig. 7 the resilient shaft C is mounted in a self-aligning ball bearing D allowing angular deviation, and the shaft C is connected to a suitable driving motor by a flexible driving shaft E. In Fig. 8 the resilient shaft C is mounted in a roller bearing F which does not allow angular deviation and the roller body A is provided with axially separated supporting surfaces A' which are adapted to make contact with the roller track B during the operation of the vibrator. In Fig. 9 the resilient shaft C merges into a rigid shaft-end G which projects from a driving motor H whereby the bearing of the motor H likewise serves in principle as a bearing for the resilient shaft C of the vibrator. Fig. 10 shows a direct application of the principle illustrated in Figs. 2 and 3 with the sole difference that the resilient shaft C of the vibrator is here mounted in a roller bearing F which does not allow angular deviation. In view of the earlier description of the inventive principle a more detailed description of the forms of construction illustrated in Figs. 7-10 should not be necessary.

What we claim is:

1. A conical pendulum type rotary vibrator comprising a rotatable shaft having a substantial resiliently flexible portion, a fixed bearing supporting one end of the shaft and precluding angular deviation thereof at the bearing, a roller body on the other end of the shaft, a roller track positioned substantially coaxially with the bearing and having a diameter increasing in a direction away from the bearing; an annular surface on the roller body adapted to engage the roller track so that the roller body executes a vibration producing planetary movement around the roller track when rotated by the shaft, a counterbalancing portion of the roller body more remote from the bearing than the annular surface and having a generatrix radially displaced from the roller track when the annular surface is urged into engagement with the roller track with the roller body at rest; the counterbalancing portion having a mass sufficient to generate, during the planetary rolling movement of the roller body along the roller track, a moment around the point of contact between the roller body and the roller track greater than the moment generated around said point of contact by the shaft and portions of the roller body nearer the bearing than the annular surface.

2. A vibrator as defined in claim 1 wherein the generatrix of the counterbalancing portion of the roller body coincides during normal operation of the vibrator with the generatrix of the roller track.

3. A vibrator as defined in claim 1 in which a portion of the shaft adjacent to the roller body is stiffened.

4. A conical pendulum type rotary vibrator comprising a rotatable shaft having a substantial resiliently flexible portion, a drive motor bearing supporting a stiffened end of the shaft, a roller body on the other end of the shaft, a roller track positioned substantially coaxially with the bearing and having a diameter increasing in a direction away from the bearing; an annular surface on the roller body adapted to engage the roller track so that the roller body executes a vibration producing planetary movement around the roller track when rotated by the shaft, a counterbalancing portion of the roller body more remote from the bearing than the annular surface and having a generatrix radially displaced from the roller track when the annular surface is urged into engagement with the roller track with the roller body at rest; the counterbalancing portion having a mass sufficient to generate, during the planetary rolling movement of the roller body along the roller track, a moment around the point of contact between the roller body and the roller track greater than the moment generated around said point of contact by the shaft and portions of the roller body nearer the bearing than the annular surface.

References Cited in the file of this patent

UNITED STATES PATENTS

| | | |
|---|---|---|
| 2,437,983 | Wenander | Mar. 16, 1948 |
| 2,546,806 | Wenander | Mar. 27, 1951 |

FOREIGN PATENTS

| | | |
|---|---|---|
| 541,057 | Great Britain | Nov. 11, 1941 |